(12) United States Patent
Konig et al.

(10) Patent No.: US 7,970,808 B2
(45) Date of Patent: Jun. 28, 2011

(54) LEVERAGING CROSS-DOCUMENT CONTEXT TO LABEL ENTITY

(75) Inventors: Arnd Christian Konig, Kirkland, WA (US); Venkatesh Ganti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/114,824

(22) Filed: May 5, 2008

(65) Prior Publication Data
US 2009/0282012 A1 Nov. 12, 2009

(51) Int. Cl.
*G06F 17/30* (2006.01)
(52) U.S. Cl. ...................................................... 707/962
(58) Field of Classification Search .................. 707/609, 707/705, 765, 802, 962, E17.048
See application file for complete search history.

(56) References Cited

U.S. PATENT DOCUMENTS

| | | | |
|---|---|---|---|
| 5,297,039 A | 3/1994 | Kanaegami et al. | |
| 5,619,709 A | 4/1997 | Caid et al. | |
| 5,819,258 A | 10/1998 | Vaithyanathan et al. | |
| 6,052,693 A | 4/2000 | Smith et al. | |
| 6,076,088 A | 6/2000 | Paik et al. | |
| 6,556,983 B1 | 4/2003 | Altschuler et al. | |
| 6,651,218 B1 | 11/2003 | Adler et al. | |
| 7,139,752 B2 | 11/2006 | Broder et al. | |
| 2004/0194009 A1 | 9/2004 | LaComb et al. | |
| 2009/0019032 A1* | 1/2009 | Bundschus et al. | 707/5 |

OTHER PUBLICATIONS

Chandel et al.; Efficient Batch Top-k Search for Dictionary-based Entity Recognition, 2006 IEEE, pp. 1-10.*

Boguraev, et al., "The effects of analysing cohesion on document summarisation", Proceedings of the 18th conference on Computational linguistics—vol. 1. 2000. pp. 76-82.

Fuller, et al., "A knowledgebase system to enhance scientific discovery: Telemakus", Biomedical Digital Libraries—Research. Published: Sep. 21, 2004 Biomedical Digital Libraries. pp. 1-15. Article available on: http://www.bio-diglib.com/content/1/1/2.

"MultiMatch", Information Society Technologies, Technology-enhanced Learning and Access to Cultural Heritage Instrument: Specific Targeted Research Project. 2006. pp. 1-127.

Mei, et al., "A Mixture Model for Contextual Text Mining", KDD'06, Aug. 20-23, 2006, Philadelphia, Pennsylvania, USA. pp. 649-655.

Downey, et al., "A Probabilistic Model of Redundancy in Information Extraction", In. Procs. of IJCAI, 2005. 8 Pages.

Cafarella, et al., "A Search Engine for Natural Language Applications", WWW 2005, May 10-14, 2005, Chiba, Japan.

Pang, et al., "A Sentimental Education: Sentiment Analysis Using Subjectivity Summarization Based on Minimum Cuts", Proceedings of the 42nd Annual Meeting on Association for Computational Linguistics. Barcelona, Spain Article No. 271. Year of Publication: 2004. 8 Pages.

Cormode, et al., "An Improved Data Stream Summary: The Count-Min Sketch and its Applications", Journal of Algorithms vol. 55, Issue 1 (Apr. 2005). pp. 58-75.

(Continued)

*Primary Examiner* — Fred I Ehichioya (57) ABSTRACT

Entities, such as people, places and things, are labeled based on information collected across a possibly large number of documents. One or more documents are scanned to recognize the entities, and features are extracted from the context in which those entities occur in the documents. Observed entity-feature pairs are stored either in an in-memory store or an external store. A store manager optimizes use of the limited amount of space for an in-memory store by determining which store to put an entity-feature pair in, and when to evict features from the in-memory store to make room for new pairs. Feature that may be observed in an entity's context may take forms such as specific word sequences or membership in a particular list.

17 Claims, 8 Drawing Sheets

OTHER PUBLICATIONS

McCallum, et al., "Early Results for Named Entity Recognition with Conditional Random Fields, Feature Induction andWeb-Enhanced Lexicons" Seventh Conference on Natural Language Learning (CoNLL), 2003. 4 Pages.

Platt, "Fast Training of Support Vector Machines Using Sequential Minimal Optimization", Chapter 12, Advances in Kernel Methods—Support Vector Learning,pp. 185-208, MIT Press, (1999).

Graefe, "Implementing Sorting in Database Systems", ACM Computing Surveys, vol. 38, No. 3, Article 10, Publication date: Sep. 2006. 37 Pages.

Dumais, et al., "Inductive Learning Algorithms and Representations for Text Categorization", Conference on Information and Knowledge Management. Proceedings of the seventh international conference on Information and knowledge management. Bethesda, Maryland, United States. Year of Publication: 1998. pp. 148-155.

Cohen, "Information Extraction and Integration: an Overview", Apr. 26, 2004. 81 Pages.

Grishman, "Information Extraction: Techniques and Challenges", Lecture Notes In Computer Science; vol. 1299. International Summer School on Information Extraction: A Multidisciplinary Approach to an Emerging Information Technology. Year of Publication 1997. pp. 10-27.

Appelt, et al., "Introduction to Information Extraction Technology", A Tutorial Prepared for IJCAI-99. Artificial Intelligence Center, SRI International,333 Ravenswood Ave, Menlo Park, CA. pp. 1-41. Dated: 1999.

Cafarella, et al., "KnowItNow: Fast, Scalable Information Extraction from the Web", Proceedings of Human Language Technology Conference and Conference on Empirical Methods in Natural Language Processing (HLT/EMNLP), pp. 563-570, Vancouver, Oct. 2005.

Cucerzan, "Large-Scale Named Entity Disambiguation Based on Wikipedia Data", The EMNLP-CoNLL Joint Conference. Prague, 2007. pp. 708-716.

Zhou, et al., "Named Entity Recognition using an HMM-based Chunk Tagger", Proceedings of the 40th Annual Meeting of the Association for Computational Linguistics (ACL), Philadelphia, Jul. 2002, pp. 473-480.

Banko, et al., "Open Information Extraction from the Web", In. Proc. 20th IJCAI, pp. 2670-2676, Jan. 2007.

Graefe, "Query Evaluation Techniques for Large Databases", ACM Computing Surveys. vol. 25, No. 2. Jun. 1993, pp. 1-98.

Agichtein, et al., "Querying Text Databases for Efficient Information Extraction", Proceedings of the 19th IEEE International Conference on Data Engineering (ICDE), 2003. pp. 1-12.

Konig, et al., "Reducing the Human Overhead in Text Categorization", KDD'06, Aug. 20-23, 2006, Philadelphia, Pennsylvania, USA. pp. 598-603.

Cafarella, et al., "Relational Web Search", WWW2006, May 22-26, 2006, Edinburgh, UK. 9 Pages.

Agichtein, et al., "Scalable Information Extraction and Integration" Aug. 2006. 116 Pages.

Agichtein, "Scaling Information Extraction to Large Document Collections", 2005 Bulletin of the IEEE Computer Society Technical Committee on Data Engineering. pp. 1-8.

Feldman, "Self-supervised Relation Extraction from the Web", ISMIS 2006, LNAI 4203, pp. 755-764, 2006.

Archak, et al., "Show me the Money! Deriving the Pricing Power of Product Features by Mining Consumer Reviews", KDD'07, Aug. 12-15, 2007, San Jose, California, USA. 10 Pages.

Rosenfeld, et al., "TEG—a hybrid approach to information extraction", Knowledge Information Systems (2005) 00: 1-18.

Joachims, "Text Categorization with Support Vector Machines: Learning with Many Relevant Features", LS-8, Report 23. Apr. 19, 1998. 18 Pages.

Winkler, "The State of Record Linkage and Current Research Problems", Technical report, Statistical Research Division, U.S. Census Bureau, Washington, DC, 1999. 15 Pages.

Ipeirotis, et al., "To Search or to Crawl? Towards a Query Optimizer for Text-Centric Tasks", SIGMOD 2006, Jun. 27-29, 2006, Chicago, Illinois, USA.12 Pages.

Joachims, "Training Linear SVMs in Linear Time", KDD'06, Aug. 20-23, 2006, Philadelphia, Pennsylvania, USA. pp. 217-226.

Cormode, et al., "What's Hot and What's Not: Tracking Most Frequent Items Dynamically", PODS 2003, Jun. 9-12, 2003, San Diego, CA. pp. 296-306.

Chandel, et al., "Efficient Batch Top-k Search for Dictionary-based Entity Recognition", IEEE ICDE Conf., 2006. pp. 1-10.

Navarro, et al., "Flexible Pattern Matching in Strings", Cambridge University Press, 2002, pp. 41-55.

Bloom, "Space/Time Tradeoffs in Hash Coding with Allowable Errors", In Communications of the ACM 13(7), 1970. pp. 422-426.

Pekar, et al., "Discovery of Language Resources on the Web: Information Extraction from Heterogeneous Documents", Literary and Linguistic Computing, retrieved at <<http://llc.oxfordjournals.org/content/22/3/329.full.pdf+html>>, dated Apr. 20, 2007, 329-343, vol. 22, No. 3.

Vapnik, Vladimir Naumovich, Statistical Learning Theory, dated 1998, 424-435, Wiley, New York.

Ganti, et al., "Entity Categorization Over Large Document Collections", in Proceeding of the 14th ACM SIGKDD international conference on Knowledge discovery and data mining (KDD '08), retrieved at << http://www.ics.uci.edu/~rares/pub/kdd08-p274-ganti.pdf>>, Aug. 24-27, 2008, 274-282, Las Vegas, Nevada.

* cited by examiner

LEVERAGING CROSS-DOCUMENT CONTEXT TO LABEL ENTITY

BACKGROUND

Much information exists in an unstructured form. For example, information may be found in the form of prose, contained in a text document or in the text portion of a Hypertext Markup Language (HTML) document. One type of information-processing task is to extract structured information, such as unary relations, from an unstructured document. Examples of unary relations are "is_a_painter," "is_a_researcher," "is_a_camera," etc. A document might contain words and phrases suggesting that the entity "John_Smith" is a painter (e.g., "We admired the oil paintings by John Smith . . . "). Based on the existence of these words, a classifier might extract the unary relation is_a_painter (John_Smith) from the document. Intuitively, a unary relation is like a label. To extract the relation is_a_painter ("John_Smith") from a document is to say that "painter" is (or may be) an appropriate label for the entity "John Smith." Being able to mine this type of information from document collections may help to answer complex queries, such as "painters whose work adorns the halls of the Metropolitan Museum." Answering this query might involve obtaining a list of painters, so unary relation extraction can assist with identifying those entities that are painters.

One way to extract unary relations from documents it to recognize an entity name in the document and to make inferences about the entity from some context, such as the words surrounding the entity name. So if "John Smith" is recognized as an entity name, then the phrase "paintings by John Smith are oil-on-canvas" strongly suggests that John Smith is a painter. A classifier might extract the unary relation is_a_painter(John_Smith) from a single document based on the presence of this statement in that document. However, some statements suggest, more weakly, that John Smith is a painter. For example, the statement "John Smith's work is in the museum," might mean that John Smith is a painter, but might also mean that he is a sculptor, or a paleontologist, or the museum's accountant. Similarly, other documents might say "John Smith works with oil" (which might imply a painter or an auto mechanic), or "John Smith works with brushes" (which might imply a painter or a hairdresser). While each of these statements says something about whether John Smith is a painter, it is difficult to conclude that John Smith actually is a painter from a document that contains one of these weak statements but no stronger statement.

SUMMARY

Unary relations may be extracted from weakly-predictive features by leveraging features of the entity collected from several documents. For each context in which an entity name appears, a feature associated with that context may be identified. For example, " . . . the painting by [Entity] adorns the main . . . " is an example of a context in which an entity appears. The phrase "painting by" is a feature occurring in this context. Entity-feature pairs may be extracted from a (possibly large) corpus of documents.

A feature may have a certain value in predicting whether a particular label applies to a given entity, and the feature may be assigned a weight based on its predictive value. The weights for the various features that occur in any of the entity's contexts may be added together to generate a sum. The weights may have positive or negative signs depending on whether they tend to suggest applicability or inapplicability of a particular label, so some weights may increase the sum and some weights may decrease the sum. If the sum of the weights exceeds a threshold, then the label is considered to apply to the entity, so the appropriate unary relation is extracted. For example, if an extractor is considering a corpus of documents to determine whether the entity John_Smith is a painter, and the threshold is 10 and the sum of the feature weights is 11.5, then the extractor may find the label "painter" applies to John_Smith, and thus may extract the unary relation is_a_painter(John_Smith).

An in-memory entity-feature store (which stores entity-feature pairs) can be managed in order to fit within a given amount of memory. When a memory limit is reached, features can be evicted from the store, and written to an external location, based on certain criteria. Maintaining features in memory supports fast lookup of existing features, thereby providing efficiency by avoiding writing redundant pairs. Management of the in-memory entity-feature store may involve identifying those entities that are likely to recur frequently in the documents, thereby maximizing the benefit of fast lookup. Moreover, it is possible to extract certain relations before all of the documents have been examined, and the remaining documents can be used to verify the correctness of a label assigned to an entity (and to change the label if justified). This later technique may reduce the number of features that have to be tracked, and stored in memory, for the labeled entity.

Additionally, lists may exist that classify certain types of entities together, such as lists of book titles, lists of professional sports associations, lists of actors, etc. Membership in a list may help with labeling an entity, since the fact that a list member occurs in an entity's context may be viewed as a type of feature. For example, if a document says, "John Smith is drafted by the National Basketball Association," then knowing that the National Basketball Association is a member of a list of professional sports associations may help to classify John Smith as an athlete. This example aggregates the significance of a feature's occurrence in an entity's context over the occurrence of individual members in a list. An entity's occurrence with "National Basketball Association" might not have enough weight. But, if all sports associations occurring with athletes are grouped together as one feature, then the feature might have a significantly higher weight.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

One area of information processing is extraction of structured information from unstructured data. Structured data, such as a database or extensible Markup Language (XML) file that follows a schema, is relatively easy to interpret, since the structure is normally designed to allow the meaning of the data to be easily interpreted. However, unstructured information, such as prose written in English or another human language, is more difficult to interpret. Extraction is a process in which certain types of structured information are obtained from an unstructured document.

One type of extraction is to identify unary relations that apply to entities named in a document. Example of unary relations include "is_a_painter", "is_a_camera", etc. These relations may be thought of as labels. For example, if the entity named "John_Smith" is a painter but not a camera, then the label "painter" is appropriate for this entity, and the label "camera" is not. Thus, an appropriate set of unary relations describing John_Smith might be is_a_painter(John_Smith) (a positive label), and NOT(is_a_camera(John_Smith)) (a negative label). For convenience, the notion of extracting a unary relation for an entity may be referred to herein as labeling or classifying an entity.

Some types of statements that appear in documents may strongly suggest that a particular label applies. For example, the statement "Buick is a kind of car" leaves little to the imagination, and it is a reasonable to conclude from this statement that the label "car" applies to the entity "Buick". It is possible that this label is wrong. For example, the document might be titled, "Everything in this document is false," or the statement could be a quote from a person who had been established elsewhere in the document to be an unreliable declarant. However, it is at least reasonable to conclude from this statement, with high confidence, that the label "car" applies to "Buick" (even if there is some outlying reason why that conclusion might turn out to be wrong). An extraction process attempts to draw these types of reasonable conclusions about entities from statements in documents, and to apply labels to these entities as accurately as it can.

However, the nature of human language is such that many statements are not as clear as the Buick statement above. A statement could be subject to ambiguity, irony, sarcasm, etc., and the statement's true meaning might not be apparent without reference to something several paragraphs away, or perhaps in a separate document altogether. Thus, sometimes the context in which an entity appears does not provide a clear indication of what whether a particular label applies to an entity. If a relation extractor (or "classifier") is attempting to determine whether the label "painter" applies to the entity "John_Smith", there may be no statement that clearly resolves this question one way or the other. For example, if a document says, "John Smith works with a brush," that might mean John Smith is a painter, but it also might mean that he is a hairdresser, or that he builds direct-current motors. Other documents might contain similarly ambiguous statements, such as "John Smith works with oil" (which might refer to oil paint or motor oil), or "John Smith's work is in the museum" (which might mean he is a painter, sculptor, paleontologist, the museum's accountant, etc.). None of these statements demonstrate, with much certainty, that John_Smith is actually a painter. However, the combination of these statements seems to suggest that John_Smith is a painter. The subject matter herein may be used to extract an entity's label from these types of weakly-predictive statements, which may be collected across a (possibly large) body of documents.

Figure 1:
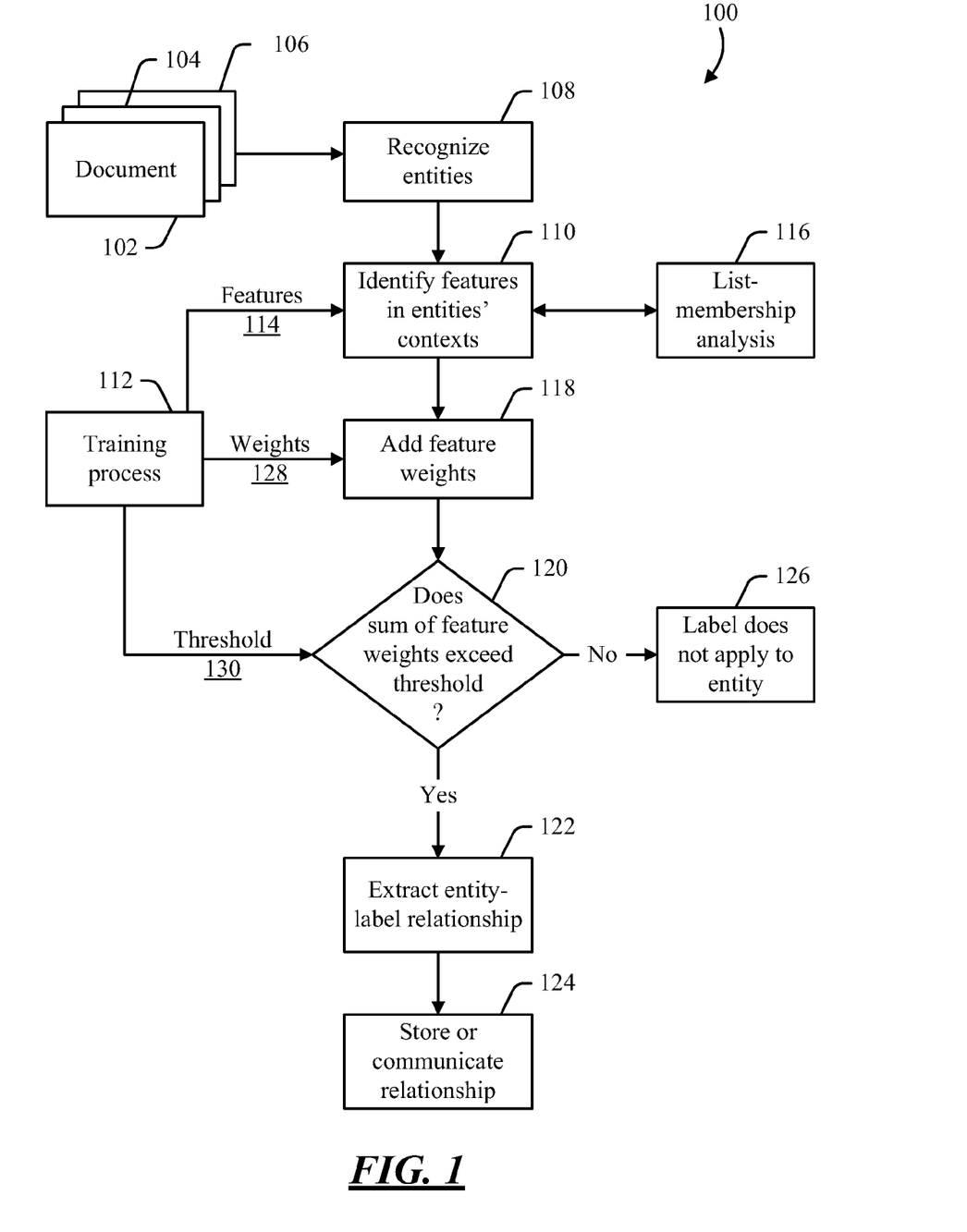
FIG. 1 is a flow diagram of an example process in which entity-label relationships may be extracted from one or more documents.

Turning now to the drawings, FIG. 1 shows an example process 100 that may be used to extract entity-label relationships from one or more documents. One or more documents may be provided as input to process 100. As an example, FIG. 1 shows three documents, 102, 104, and 106, although any number of documents could be provided as input to process 100. The documents could be text documents, HTML documents, XML documents, or any other type of document. The documents may contain some type of unstructured information, such as prose written in English or another human language. (Technically, documents in a markup language like HTML or XML are structured, but the information to be extracted may be contained in an unstructured form within some structure of the documents—e.g., the information of interest may be found in unstructured English-language text contained within the <body> and </body> tags of an HTML document.)

For the documents provided as inputs, entity recognition may be performed (at 108) to identify the entities named within the documents. Entities may be any person, place, thing, organization, concept, etc., that has a name. For example, any of the following could be the names of entities: "John Smith", "National Basketball Association", "tomato", "socialism". Each entity may have a canonical form and one or more surface forms. For example, "John Smith", "J. Smith", "Jack Smith", and "John H. Smith, III" might all be surface forms of the same entity. The surface forms are the forms that one would expect to encounter in a document. One of these surface forms could be adopted as the canonical form. Alternatively, a symbolic representation that is not one of the surface forms could also be adopted as the canonical form. For example, the canonical form of the entity identified by the above-listed surface forms might be "John Smith", "John_Smith", "JS", "Person-1", or anything else. In general, an entity recognizer identifies the entities present in a document based on the surface forms of that entity. The entity recognizer may provide the canonical form as output, although the particular form that the recognizer provides as output is unimportant as long as the output identifies entities that are recognized in the document. An entity recognizer, $g_E$, may be described as $g_E: d \rightarrow \{e_1, \ldots, e_n\}$, where $\mathcal{D}$ is a set of documents, $d \in \mathcal{D}$, and $\{e_1, \ldots, e_n\}$ is a set of entities recognized in the documents. Entity recognizers, and processes of entity recognition, are generally known.

At 110, features that occur in the entities' contexts are identified. Before turning to a formal discussion of this stage of process 100, a brief explanation is provided of what a feature is and what a context is. A feature could be viewed as a fact that can be discovered about an entity from a document. A context is a place in the document that one would look for the feature. For example, suppose that a particular entity has the surface form "Picasso." The entity's context might be defined as the six words surrounding the word Picasso (three words before and three words after). If a document contains the sentence, "The painting by Picasso adorns the main hall of the Museum of Art in New Delhi", then an example context defined by the six words surrounding occurrence of the entity is: "The painting by [Entity: Picasso] adorns the main". Thus, an extraction process could look for features that occur in that context. One type of feature that might occur is a sequence of n words, sometimes referred to as a text n-gram. For example, if a particular extraction process is searching for entities to which the label "painter" applies, then the 2-gram "painting by" might be a relevant clue as to whether a given entity is a painter. Thus, the process could search for the words "painting by" in an entity's context. Since this 2-gram does appear in the example context of "Picaso" described above, "painting by" is a feature of "Picaso." A feature is not the same as a label, but the features associated with an entity may be used to determine whether a particular label is to be assigned to an entity. Examples of how features can be used to make this decision are further described below. (The particular features that are relevant to assignment of a label may be discovered during a training process 112. Training process 112 may result in features 114 being provided to process 100, so that 110 can search for those features in the entities' contexts. Training process 112 may be performed using any machine learning techniques, and such techniques are generally known.)

The preceding example shows a specific type of feature and a specific type of context, although both of these concepts generalize. In particular, the context described above is a size-3 window of words surrounding an entity. Formally, if an entity, e, occurs in a document in a surface form $s_e$ starting at position p, then the size-K context of the entity $s_e$ is the window of words, $w_{p-K}, \ldots, w_{p-1}, w_{p+|s_e|+1}, \ldots, w_{p+|s_e|+K}$, that surrounds the entity's occurrence (where $|s_e|$ is the number of words in surface form $s_e$) However, context of an entity may involve any aspect of the document, such as the title, paragraph headers, section headers, etc. The words surrounding an entity are merely an example of a context. The set of features that occur in entity e's context within a document may be referred to as e's "document context." In order to consider the features obtained from several documents, it is possible to define an aggregated context (written AggContext (e, $S_d$)), which represents, for a set of documents $S_d$, the set of features that occur in entity e's context in any of the documents in $S_d$. The subject matter described herein may be used to derive a label from an aggregated document context that is obtained from a large collection of documents. (Using techniques described below, it is possible to consider an entity's aggregated context without materializing the aggregated context in memory. However, it is convenient to consider the features that are in an entity's aggregated context, regardless of whether that context is actually materialized.)

Moreover, text n-grams are merely examples of features that could be found in an entity's context. Other kinds of features could be found. Another type of feature is that could be found in an entity's context is the name of another entity that happens to be a member of a list. For example, it may be the case that the names of art museums are often mentioned in the same context as a painter. One could define the n-gram names of various art museums (e.g., "Barnes Foundation", "Chelsea Museum", "Guggenheim", etc.) as separate features, and could search for those features separately. However, it would be difficult and unwieldy to treat each museum name as a separate feature, as the relevant information for label extraction may be the co-occurrence of an entity with a museum, and not the precise name of the museum itself. If there is a document that contains a list of art museums, then the relevant feature might be that the entity's context contains a member of that list rather than a particular n-gram museum name. Features that are defined in terms of a member of a list appearing in an entity's context may be referred to as list-membership features. The identification of list-membership features may be assisted by a list-membership analysis 116. Example techniques for performing list-membership analysis 116 are discussed below.

Text n-grams and list-membership features are examples of features that could exist in an entity's context, although other types of features could be used.

At 118, weights assigned to the features found in an entity's contexts are added together. Some features, when present in an entity's context, tend to suggest that a particular label applies to that entity. Other features, when present in an entity's context, tend to suggest that the label does not apply to that entity. Different features may point toward (or away from) applicability of a label with varying degrees of strength. Weights may be assigned to features take into account both the magnitude and direction of a feature's bearing on a particular label assignment. For example, if features are rated on a scale of +1.0 to −1.0, then a feature that strongly suggests the applicability of a label could be assigned a value like +0.9, while a feature that weakly suggests the non-applicability of a label could be assigned a value like −0.3. It is relatively easy to label a document when the features have high weights, representing a high correlation between the feature and the label. However, the subject matter described herein may be used to label documents based on features having low weights, collected across several documents.

The weights of features in an entity's aggregated context may be added together. The labeling decision may be made based whether the sum of the weights exceeds a threshold (as determined at 120). If the sum of the weights does exceed the threshold, then the label applies to the entity (at 122). The fact that this relationship exists could be stored or communicated (at 124). If the sum of the weights does not exceed the threshold, then the label does not apply to the entity (at 126). The particular weights chosen for various features may be learned during training process 112. Thus, training process 112 may provide the weights 128 associated with various features, and may also provide threshold 130. (As shown in FIG. 1, weights 128 may be used in 118, and threshold 130 may be used in 120.)

As discussed below, it may be possible to determine whether the sum of the feature weights for a particular entity's aggregated context exceeds a threshold, without directly computing the aggregated context and without directly summing the weights of the features that appear in the entity's aggregated context. However, it will be understood that process 100 covers labeling decision regardless of how feature are extracted from contexts, and regardless of how the weights of those features are used in the labeling decision.

The following is a formal description of how entities may be labeled based on the features in their aggregated contexts.

If $\mathcal{D}$ is a set of documents, then the contents of a particular document, $d_i \in \mathcal{D}$, may be modeled as a set of entity-feature pairs. Thus, if $\in$ represents the set of all entities mentioned in $\mathcal{D}$ (where this set may or may not be known at the time that processing of the documents in $\mathcal{D}$ begins) and $\mathcal{F}$ is a set of features to be extracted from those documents, then, from the perspective of the task of labeling documents based on the features present in the document, document $d_i$ may be represented as a subset of all possible entity-feature pairs, or $d_i \subseteq \in \times \mathcal{F}$. This model treats the occurrence/non-occurrence of a feature in an entity's document context as a binary event: either a feature, $f \in \mathcal{F}$, is a member of the entity's context in document $d_i$ or it is not. It is possible to use the techniques described herein to take into account how many times a feature occurs in any of an entity's contexts (which may be referred to as the feature's frequency). However, in the discussion herein, a document is modeled as a set of entity-features pairs extracted from the document, without regard to how many times a feature is found a given entity's context(s).

A classifier may be modeled as a function, c, that takes a feature vector as input, and indicates whether or not a particular label applies to the entity characterized by the feature vector. There may be a set of classifiers, $c_1, \ldots, c_i$, each of which determines the applicability of a label. For a given classifier, there may be a set of features that the classifier uses to determine whether the label targeted by that classifier applies to an entity. If classifier $c_i$ uses n features to determine whether a particular label applies to an entity, then $c_i$ takes as input a feature vector, $F(c_i)=[f_{i,1}, \ldots, f_{i,n}]$. A feature vector is created for each entity that is to be classified by the classifier. The values of the elements in the feature vector are collected from analysis of the input documents (e.g., the analysis performed at 108 and 110, in FIG. 1), where this analysis results in a determination as to whether each of the features appeared in any of the entity's contexts. For example, for a given entity, e, if feature $f_{1,i}$ appears in some context of e in some input document, then $f_{1,i}$ could have a value of one; otherwise $f_{1,i}$ could have a value of zero. The actual representation of the feature vector is unimportant, as long as the vector indicates whether a feature was found in some context of the entity, or not. Thus, suppose that $c_1$ is the classifier that determines whether the label "painter" applies to an entity, and one wants to determine whether the entity whose canonical name is "John_Smith" is a painter. Then, a set of documents is analyzed to identify occurrences of the entity "John_Smith" (at 108 in FIG. 1), and to determine which features occur in that entity's context (at 110 in FIG. 1). This analysis may produce a feature vector that indicates, for all features to be considered by classifier $c_1$, whether those features are present in the documents examined. $c_1$ receives the feature vector and provides a determination of whether those features are characteristic of a painter. If the features are characteristic of a painter, then the entity associated with those features ("John_Smith" in this example) may be labeled as a painter. Otherwise, the entity is not labeled a painter.

A mechanism by which a classifier may determine the applicability of a label is to use a weight assigned to each feature in the vector, add the weights for those features that are present in an entity's context, and then determine whether the result exceeds some threshold. Thus, if $\mathcal{F}$ is a set of features, then weight($\mathcal{F}$) is the additive weight of those features, where weight($\mathcal{F}$)=$\Sigma_{f \in F} w_f$ (In this equation, $w_f$ is the weight of a particular feature f.) If $\mathcal{D}' \subseteq \mathcal{D}$ is set of documents, then one may write $\mathcal{F}_e(\mathcal{D}')$ to denote the set features collected from documents $\mathcal{D}'$, and weight($\mathcal{F}_e(\mathcal{D}')$) (or weight(e,$\mathcal{D}'$)) to denote the weight summed over features $\mathcal{F}_e(\mathcal{D}')$. In this case, a classifier may be described as $$c_i(e)=sgn(\text{weight}(e,\mathcal{D}')+b). \quad (1)$$

In equation (1), the sgn function is either +1 or −1, based on the sign of its argument, so $c_i$ returns positive or negative depending on whether the features of e collected over $\mathcal{D}'$ indicate that the label targeted by $c_i$ is, or is not, applicable to e. b represents a threshold value that the weights are to exceed in order for the label to apply. For example, if a label is to be applied to an entity when the sum of that entity's feature weights exceeds +0.5, then b=−0.5. The weights w, and the threshold value b, may be learned during a training process, and may be provided to the labeling process (as in 128 and 130, in FIG. 1), so that they can be used by the classifiers.

Weighted features may be used in the manner described above to classify documents. Features with weights of low magnitude correspond to features having low predictive value. It can be seen from the foregoing discussion that these low-predictive-value features, which weakly suggest whether a label applies, may not, in small numbers, be able to exceed the threshold that justifies applying a label to an entity. Since a small number of entity-feature pairs may be extracted from a single document, and many of these features may be of low-predictive-value, a single document might not provide enough information to label an entity. However, when many features are extracted from many documents, these low-predictive-value values, in the aggregate, may provide enough information to exceed the applicable threshold and to justify finding that the label applies to an entity. Thus, the techniques described above may be used to leverage an entity's context collected over many documents.

A simple way to use the above techniques is as follows. An in-memory entity-feature store could be maintained, which stores all of the entity-feature pairs extracted from all documents in a set $\mathcal{D}$. Suppose that a goal is to use a classifier, c, to find entities to whom a particular label applies, and $\mathcal{F}$ (c) is the set of features considered by the classifier. Then each document d $\in \mathcal{D}$ may be processed with an entity recognizer. For each entity, e, recognized in d, the those features in $\mathcal{F}$ (c) that occur in the entity's document context are identified. If e is already in the entity-feature store, then the list of features found for e is updated as they are encountered. If e is not in the store, then e and its identified features are added to the store. The result of this process is data that identifies all of the features associated with each entity collected over documents $\mathcal{D}$. A feature vector, F(c), may be obtained for each entity from this data, and the vector can be provided as input to classifier c. Since the approach involves being able to look up entities and features during document processing to determine which combinations have already been observed, efficient implementation involves keeping the entity-feature store in memory. However, the number of entities and features may become very large and may exceed the amount of memory available, so this approach does not scale well. Thus, an issue that arises is to use a classifier, c, to label entities based on the entities' aggregated contexts collected over a large set of documents, and to do so within a particular amount of memory.

Figure 2:
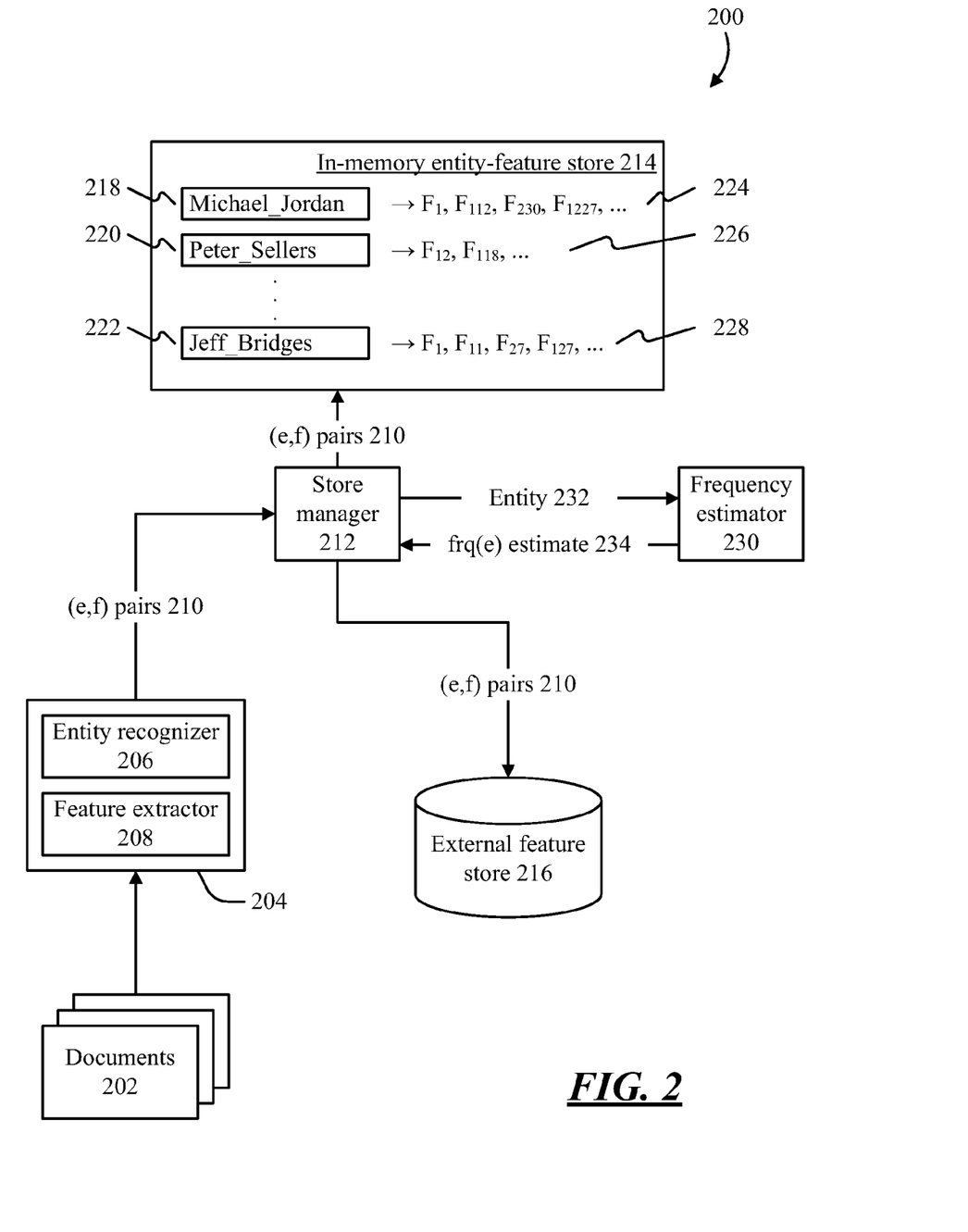
FIG. 2 is a block diagram of an example system that uses entity-feature pairs to label entities, and that maintains in-memory and external entity-feature stores.

Techniques are described below to apply a classifier, c, over an aggregated context, within a limited amount of memory. In general, the techniques involve maintaining entity-feature stores both in-memory and externally (e.g., on disk), managing the in-memory store to keep certain relevant information in the store, "early" labeling of entities in certain circumstances before all of the features have been considered, and verifying the early labels. FIG. 2 shows an example system in which these techniques could be implemented, although they could also be implemented in other systems.

System 200 may be used to process documents so that they may be classified based on entity-feature pairs. In system 200, documents 202 (which may include the documents 102, 104, and 106, shown in FIG. 1) are provided as input to a process 204 of collective entity recognition and feature extraction. Process 204 may employ, for example, an entity recognizer 206 that identifies entities in documents based on occurrence of their surface forms. Process 204 may also employ feature extractor 208 that identifies features that appear in the identified entities contexts. The output of process 204 (which may result from the collective action of entity recognizer 206 and feature extractor 208) is a set of entity-feature pairs 210 (denoted in FIG. 2 as "(e,f) pairs"). Inasmuch as classification of an entity involves determining which features are associated with that entity, entity-feature pairs 210 are stored so that they may be used in this determination. In order to store entity-feature pairs 210, the entity-feature pairs are provided to a store manager 212, which determines where to store a particular entity-feature pair.

Store manager 212 manages two entity-feature stores: an in-memory entity-feature store 214, and an external entity-feature store 216. In-memory entity-feature store 214 is typically stored in volatile random access memory (RAM), so as to be accessible for fast lookup. External entity-feature store 216 is external in the sense that it is outside of the main random access memory (although it could still be located internally within a computer). Typically, external entity-feature store 216 is located on a disk, although it could be located on any type of storage device. An entity-feature store contains data that associates entities (such as entities 218, 220, and 222 with sets of features (such as feature sets 224, 226, and 228). For example, entity-feature stores 214 contains data showing that entity 222, having canonical form "Michael_Jordan", is associated with features $F_1$, $F_{112}$, $F_{230}$, $F_{1227}$, . . . . Entities may be represented in an entity-feature store by their canonical forms (as in the case of entities 218, 220, and 222), but could be represented in any manner. In FIG. 2, in-memory entity-feature store 214 is shown as containing associations between entities and features. External entity-feature store 216 also contains associations between entities and sets of features, although for compactness of the drawing, these associations are not shown.

When store manager 212 receives one of entity-feature pairs 210, it determines whether to store the entity-feature pair in in-memory entity-feature store 214, or external entity-feature store 216. This decision may be made using processes shown in FIGS. 3 and 4. One goal of store manager 212 may be to reduce the number of redundant writes of entity-feature pairs, and store manager 212 may use this goal when determining in which of the stores to store an entity-feature pair. It will be understood that entity-feature pairs can be extracted multiple times over a document collection $\mathcal{D}$. An in-memory store supports fast lookup of entity-feature pair, and thus prevents redundant writes: If an entity-feature pair is encountered, it could be looked up in the in-memory store to determine whether it already exists in the store, or is to be added to the store. However, as noted above, the amount of memory available for an in-memory store may be limited. With an external store, such as one on disk, space considerations are less likely to limit the size of the store. However, disk lookups are slower than memory lookups, so it may not be practical to check entity-feature pairs at the time they are encountered to determine whether they are already in the store. (Redundant writes may make the classification process less efficient, since labeling an entity may involve consideration of many redundant entity-feature pairs.) By maintaining two stores, the benefits of fast lookups and large storage space may both be realized. The challenge is to choose which entities are to be kept in each of the stores. The benefit of using an in-memory store is greater for entity-feature pairs that occur frequently in $\mathcal{D}$. Thus, when an entity-feature pair is encountered that is not in in-memory store 214, store manager 212 may decide, based on the estimated frequency of that entity-feature pair, whether to write the new pair to external entity-feature store 216, or to evict another entity-feature pair from in-memory entity-feature store 214 in order to make room.

The overall frequency of an entity-feature pair in $\mathcal{D}$ is not known until all documents in $\mathcal{D}$ have been examined, so the frequency may be estimated. The frequency of an entity-feature pair may be estimated based on the individual frequencies of the entity and of the feature (e.g., as a product of these two frequencies). Feature frequencies may be obtained during training (using the assumption that features tend to appear in the training data in roughly the same frequency as they would appear in an actual document collection $\mathcal{D}$). However, since the set of entities may be different for document collection $\mathcal{D}$ than for the training data, the frequency of an entity, e, may not be estimable from the training data. Thus, a frequency estimator 230 may be used to provide this estimate. In particular, store manager 212 may provide an entity 232 to frequency estimator 230, and frequency estimator 230 may provide back to store manager 212 an estimate 234 of the entity's frequency in $\mathcal{D}$. An example process for making this estimate is described below in connection with FIGS. 5 and 6.

Figure 3:
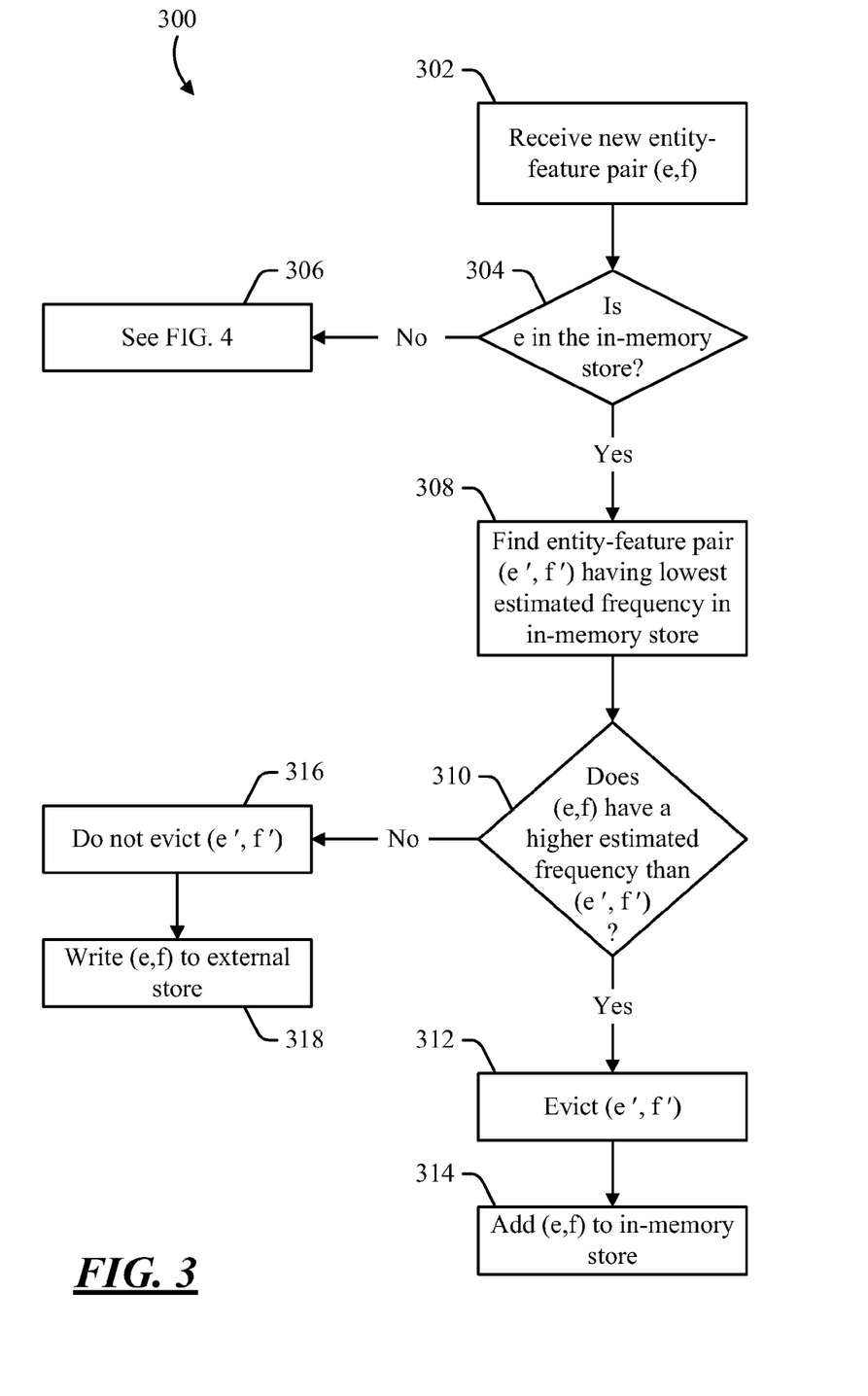
FIGS. 3 and 4 are flow diagram of example processes that may be carried out to determine whether an entity-feature pair is to be placed in an in-memory store or an external store.

FIG. 3 shows an example process 300 that may be carried out to determine whether an entity-feature pair is to be placed in an in-memory store or an external store. Process 300 may be carried out by store manager 212 (shown in FIG. 2), but could be carried out by any entity.

At 302, a new entity-feature pair (e, f) is received. Entity-feature pair (e, f) may have been encountered during processing of documents $\mathcal{D}$. If (e, f) is already in an in-memory store (such as in-memory entity-feature store 214, shown in FIG. 2), then this fact can be determined by fast lookup in that store, and (e, f) does not need to be written to any store. (It will be recalled that, in the examples herein, entity-feature pairs are considered in the binary sense of having been observed or not-observed in an entity's aggregated context; thus, if the entity-feature pair is known to have been encountered, then recording subsequent observations of that pair is redundant.)

Assuming that (e, f) is not in memory, a determination is made as to whether the new pair's entity, e, is already in the in-memory store (in the sense of there being in the store some entity-feature pair(s), other than (e, f) itself, for which e is the entity). The decision about whether to put (e, f) in the in-memory store proceeds differently depending on whether e is in the in-memory store or not. If e is not in the store (as determined at 304), then the decision as to whether to put (e, f) in the store is carried out according to the process of FIG. 4 (at 306). Otherwise, process 300 continues to 308.

If e is already in the in-memory store, then, at 308, the entity-feature pair is found that has the lowest estimated frequency of all the pairs in the in-memory store. This pair may be referred to as (e', f'). If (e, f) has a higher estimated frequency than (e', f') (as determined at 310), then it expected that the benefit of having (e, f) in the in-memory store exceeds that of having (e', f') in the store, so (e', f') is evicted from the in-memory store and written to the external store (at 312), and (e, f) is added to the in-memory store (at 314). (It will be recalled that the benefit of the in-memory store is being able to identify entity-feature pairs that have already been encountered, thereby obviating the need for (possibly redundant) writes to the external store. Thus, using the space in the in-memory store for entity-feature pairs with relatively high frequencies is expected to yield the greatest benefit from the use of memory.) If (e, f) does not have a higher expected frequency than (e', f'), then (e', f') is not evicted from the in-memory store (at 316), and (e, f) is written to the external store (at 318).

Figure 4:
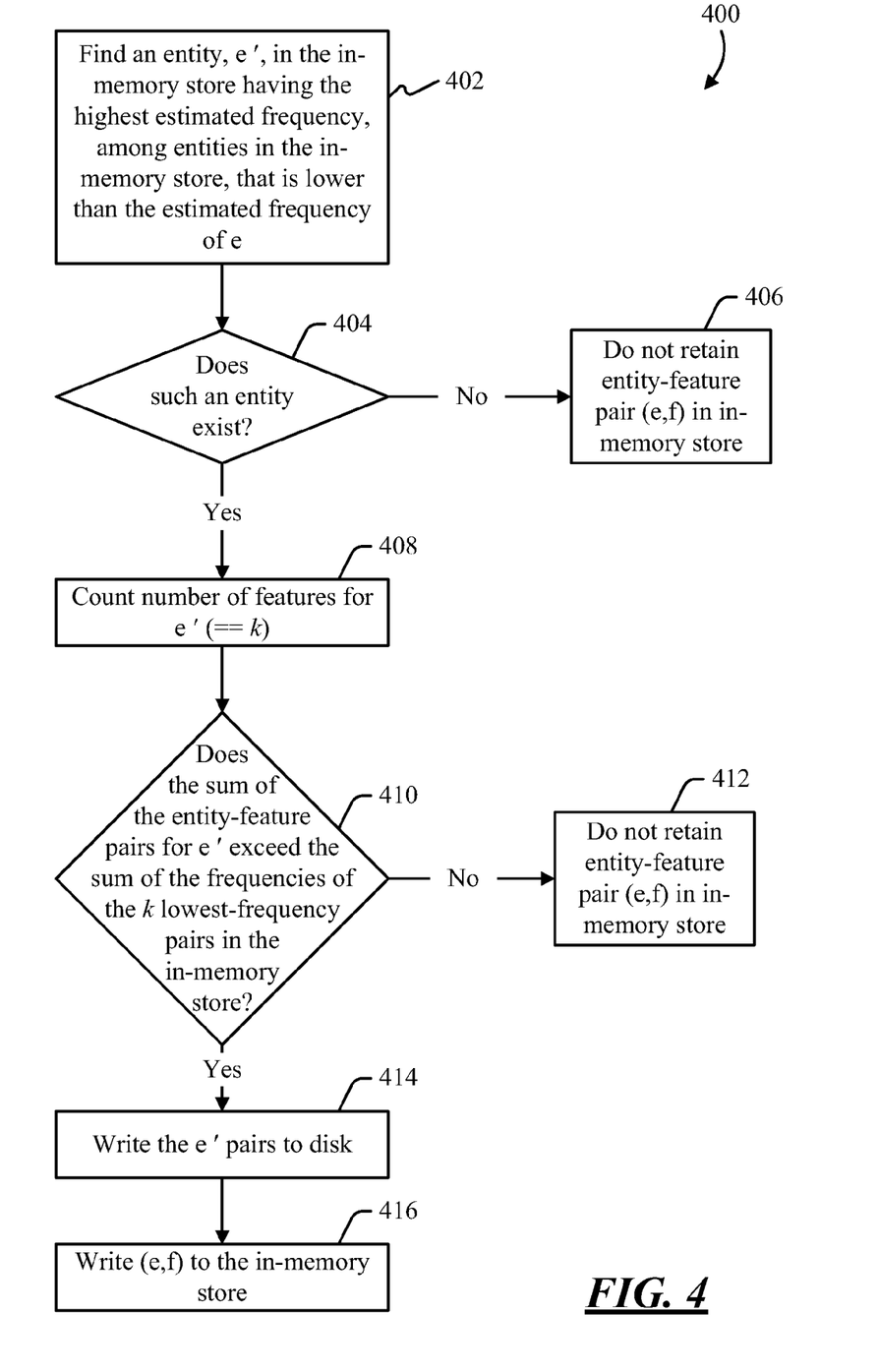

As noted above, the decision about whether to put (e, f) in the in-memory store proceeds differently depending on whether e is in the in-memory store or not. FIG. 3 shows how this decision proceeds if e is in the in-memory store. FIG. 4 shows an example process 400 of making this decision in the case that e is not in the in-memory store. In order to support fast lookup of an entity-feature pair based on the canonical-form output of an entity-recognizer, the canonical form of each entity is stored in the in-memory store. Thus, storing a pair that contains an entity not currently in the in-memory store involves evicting not only one other pair, but also enough additional pairs to make space for the canonical form of the new entity. Thus, the decision as to whether to admit the new entity takes this additional consideration into account based not merely on the estimated frequency of the new entity-feature pair (e, f), but also based on whether the new entity, e, is likely to be part of other high-frequency entity-feature pairs, since this expected future benefit figures into whether the investment of space to store e's canonical form is justified.

At 402, process 400 finds the entity, e', in the in-memory store that has the highest frequency, among entities in the in-memory store, whose estimated frequency is lower than the estimated frequency of e. In other words, 402 searches for an entity, e', whose frequency is lower than e's. However among those entities in the in-memory store that have lower estimated frequencies than e, e' has the highest frequency. It is not guaranteed that an entity, e', meeting these criteria exists in the in-memory store. If no such e' exists (as determined at 404), then the new entity-feature pair (the pair (e, f) received at 302 of FIG. 3) is not retained in the in-memory store (at 406), and is written to the external store.

If an entity e' exists that meets the above criteria (again, as determined at 404), then the decision as to whether to retain (e, f) in the in-memory store is made as follows. The number of features in the in-memory store that are associated with e' is counted. That is, a count is obtained of the number of entity-feature pairs in the in-memory store in which e' is the entity. The number of features counted may be referred to as k. The sum of the expected frequency of these k entity-feature pairs is compared with the sum of the k lowest-estimated-frequency entity-feature pairs in the in-memory store. If the sum of the k entity-feature pairs in the in-memory store in which e' is the entity exceeds the sum of the k lowest-estimated-frequency entity-feature pairs in the in-memory store (as determined at 410), then the new pair (e, f) is not retained in the in-memory store and is written to the external store (at 412). Otherwise, the pairs involving e' are written to disk (at 414), and the new pair (e, f) is retained in the in-memory store (at 416).

As described above, various parts of the decision of whether to store a new entity-feature pair (e, f) in an in-memory store involve estimating the frequency, frq(e, f), of a particular entity-feature pair's occurrence in $\mathcal{D}$. One way to estimate the frequency is $$frq(e, f) \approx \hat{frq}(e, f) = \hat{frq}(e) \cdot \hat{frq}(f), \quad (2)$$

where the circumflex symbol, in this context, refers to an estimated value. Thus, the estimated value of the frequency of an entity-feature pair is the product of the respective frequencies of the entity and the feature. The approximate frequency of features can be learned during a training process, since it can be assumed that the example documents used during the training are reasonably representative of the occurrence of features. However, the frequency of entities is not learned during the training phase, since the particular set of entities that will occur in $\mathcal{D}$ is unknown until $\mathcal{D}$ has been processed. Thus, in order to calculate equation (2), a way of estimating frq(e) is provided.

Figure 5:
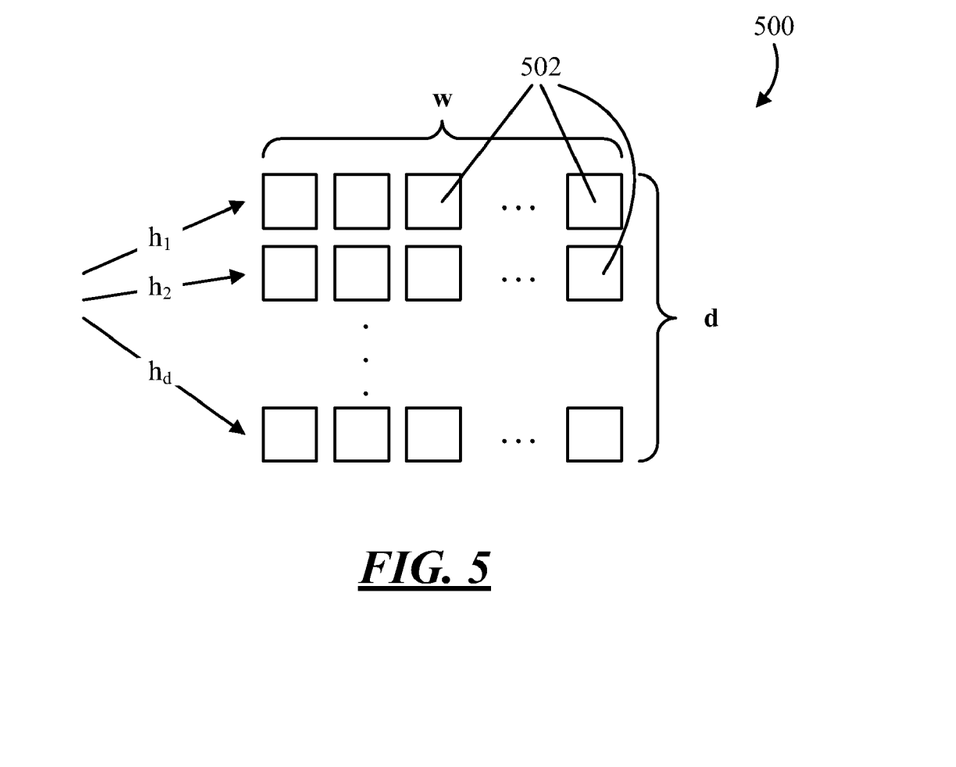
FIG. 5 is a block diagram of an array of counters that may be used to estimate entity frequency.
Figure 6:
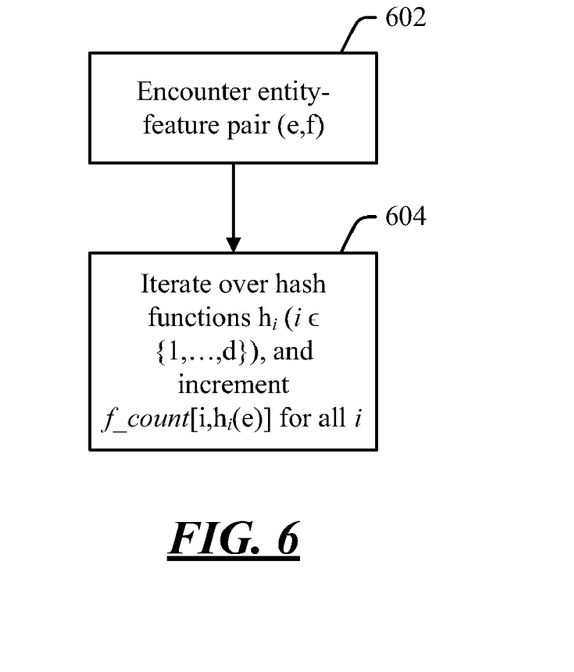
FIG. 6 is a flow diagram of an example process of populating the array of FIG. 5.

One way to estimate frq(e) is using a "Count-Min sketch." In this technique, a two dimension array 500 of width w and depth d is used, as shown in FIG. 5. (This array may be described as f_count[1 . . . d, 1 . . . w].) Each of the elements 502 in the array represents a counter. A series of hash functions $h_1, \ldots, h_d$ is provided, where the $i^{th}$ hash function generates an index into the $i^{th}$ row of the array based on entity e (so $h_1, \ldots, h_d$:e→{1, . . . , w}). FIG. 6 shows an example process of populating the values of array 500.

Prior to processing documents in $\mathcal{D}$, the counters in array 500 are initialized to zero. During document processing, an entity-feature pair, (e, f), is encountered (at 602). Each time an entity-feature pair is encountered in $\mathcal{D}$, the counters are updated in the following manner. The process iterates over all of the hash functions by incrementing f_count[i, $h_i(e)$] for all i ∈ {1, . . . , d} (at 604).

With the counters having been incremented in this manner when new entity-feature pairs are encountered, $\widehat{frq(e)}$ may be calculated as follows $$\hat{frq}(e) := \min_{j \in \{1, \ldots, d\}} f\_count[j, h_j(e)] \quad (3)$$

In other words, the frequency is proportional to the lowest value among the d different counters that get incremented when e is encountered. Some of these counters may be incremented when entities other than e are encountered, so the value given by equation (3) may not yield the precise frequency of e, but it does provide a reasonable estimate of e's frequency observed so far during the processing of $\mathcal{D}$. Moreover, to the extent that the frequency of an entity observed through part of $\mathcal{D}$ can be considered representative of the entity's frequency throughout all of $\mathcal{D}$, the estimated observed-so-far frequency provided by equation (3) can also be used to predict the frequency of an entity in the portion of $\mathcal{D}$ that has not yet been processed.

As noted above, one technique that may be used to reduce tracking of entity-feature pairs during document processing is to "optimistically" label an entity before all documents have been processed. This technique is based on the observations that, if the labeling threshold of equation (1) is met after some portion of the documents in $\mathcal{D}$ have been observed, what the remains to be seen in the remainder of the documents might not be very likely to change the assigned label. Thus, labeling an entity early has the benefit of saving the resources that would otherwise be used to track some of the entity's features. Of course, if the early labeling is wrong, then a cost is incurred in re-processing the entity, so—in choosing when to label an entity—the technique of optimistic labeling attempts to strike a balance between the benefit of labeling the entity early and the cost of choosing the wrong label.

Figure 7:
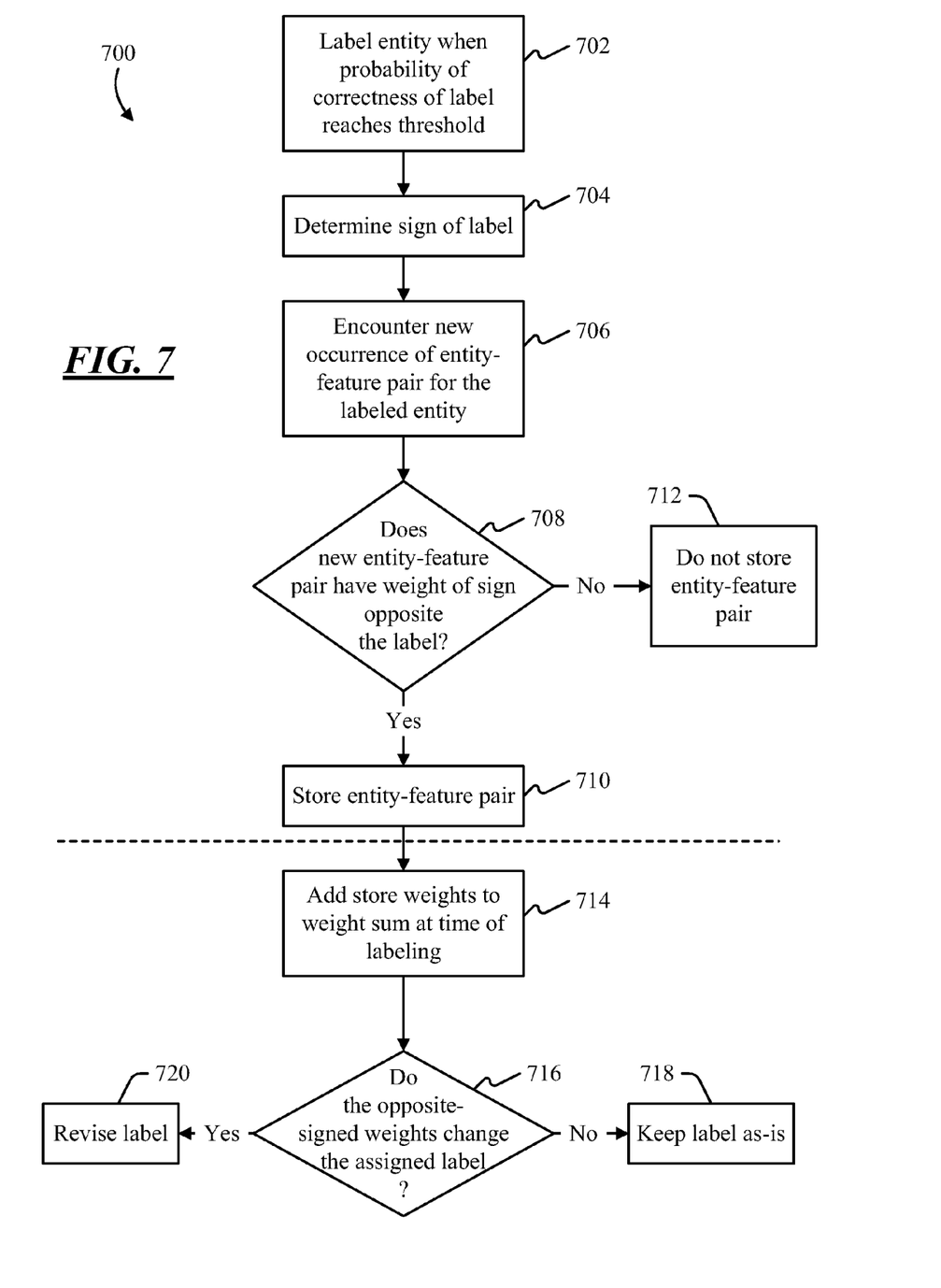
FIG. 7 is a flow diagram of an example process that may be used to optimistically label an entity and to subsequently verify that the assigned labels are correct.

FIG. 7 shows an example process 700 that may be used to optimistically label an entity and to subsequently verify that the assigned labels are correct. At 702, an entity is labeled when the probability that the correct label will be assigned exceeds some threshold. As previously discussed, an entity may be assigned a label based on the sum of the weights assigned to its features, and on whether that sum exceeds a threshold (as in equation (1) above). At any given time during document processing, the entity-feature pairs that are in the in-memory store are known, and the sum of the weights assigned to these pairs either does, or does not, exceed the threshold defined in equation (1). If the sum of the known weights exceeds a threshold, then a probability can be estimated as to whether documents yet-to-be-seen will change that fact. If, based on this estimated probability, it is considered sufficiently likely that the right label is being assigned, then the entity is labeled based on the features seen so far.

The following is a description of how the probability of a correct label (or the confidence level in that label) can be estimated after a portion of the documents have been seen. For an entity e, the weight it has after observance of the first i (not necessarily distinct) features observed when traversing $\mathcal{D}$ may be denoted as $weight_i(e, \mathcal{D})$. Pr denotes a probability function that takes a statement as an argument and returns the probability that the statement is true. Thus, the probability that a label has been assigned correctly after observance of the first i features may be written as:

$$Pr(sgn(\text{weight}_i(e, \mathcal{D})+b)=sgn(\text{weight}(e, \mathcal{D})+b)) \quad (4)$$

The training data that was used to train a classifier may also be used to estimate this probability. The training data contains a set $\in^T$ of labeled entities and a set $\mathcal{D}^T$ of documents. (The superscript T stands for "training.") Given an ordering of the documents it is possible to calculate the order in which features of an entity e are encountered during processing (which may result in duplicate features being encountered). Using this ordering information, the difference in the weights resulting after after i features have been observed versus when all features have been observed may be denoted as $\Delta_i = \text{weight}_i(e, \mathcal{D}) - \text{weight}(e, \mathcal{D})$. By iterating over several permutations of $\mathcal{D}^T$ and all entities $\in^T$, it is possible to calculate the distribution of values of $\Delta_i$. Then, this distribution may be modeled using a Gaussian $N(\mu_i, \sigma_i^2)$ (with $\mu$ being the average of all $\Delta_i$ values seen and $\sigma_i^2$ being their variance).

Now, if the total number of features i that have been observed for an entity during actual processing of $\mathcal{D}$, and thus the resulting $weight_i(e, \mathcal{D})$, are known, the above model can be used to estimate the probability of assigning an incorrect label as follows. If, after observing i features, an incorrect label is assigned, then it would be the case that the difference between observed weight and true weight is greater than $W = weight_i(e, \mathcal{D}) - b$. In the above model, this corresponds to the event that for a random variable $R \sim N(\mu_i, \sigma_i^2): R > |W|$. The probability of this event can be calculated using the standard normal $Z = (r - \mu_i)/\sigma_i$ and the appropriate lookup tables. (To save space, the $\mu_i$ and $\sigma_i$ values may be stored for a small subset of indices i, and intermediate values may be interpolated.)

In order to capture data sets in which the feature/weight distribution varies dramatically, this model may be extended to track $\Delta_i^+ \sim N(\mu_i^+, (\sigma_i^+)^2)$, which models the distribution of entity-weights with label 1, and the corresponding $\Delta_i^-$, which models entities with label -1. To estimate the probability of assigning a label $l_e$, the distribution corresponding to the label $-l_e$ is used, since the goal is to model the likelihood that an entity of the "wrong" label exhibits the weight that has been observed.

It will be observed that the $\Delta_i$ calculations described above model the confidence in an estimated label assuming that all features observed so far for that entity are being considered. However, the point of optimistic labeling is to leverage the fast lookup properties of the in-memory entity-feature store, in which all of the entity-feature pairs observed for a particular entity may not be retained (since some may have been evicted). If optimistic labeling called for features in the external store to be considered, much of the efficiency gain of optimistic labeling would be lost. Due to the eviction algorithm described above, the in-memory store is likely to be skewed toward the highest-frequency features. Thus, when a weight is calculated based on just the in-memory features, the estimate in confidence of the label may take into account that the distribution of features considered might not look like a distribution collected from a random-ordered observance of documents in $\mathcal{D}$. In order to take this issue into account, for each entity e, a number of features, l, may be maintained that represents the number of features of e that have been seen since the last feature for e was evicted from the in-memory store. Additionally, each feature in the in-memory store may be marked with a bit indicating whether this feature has been observed since the last eviction. This set of features may be denoted as $\mathcal{F}_{seen}$. Thus, the approach described above may be used with i=l and $W = \text{weight}(\mathcal{F}_{seen})$. This approach is based on the idea that, while the full set of features for entity e that are in the in-memory store at a given time might not be truly representative of the occurrence of features in the document, those features that are in $\mathcal{F}_{seen}$ are likely to be representative, since $\mathcal{F}_{seen}$ seen represents that subset of the features that have not been affected by evictions.

Using the above techniques, the decision of whether to optimistically label an entity (as in 702 of FIG. 7) may be made as follows. Given some threshold, $\alpha$, the decision to optimistically label an entity may be made if $$Pr(sgn(\text{weight}_i(e, \mathcal{D}))=sgn(\text{weight}(e, \mathcal{D}))) \geq \alpha. \quad (5)$$

Returning to FIG. 7, after the decision has been made to optimistically label an entity, the sign of the label is determined (at 704)—e.g., +1 for "John_Smith is a painter", or -1 for "John_Smith is not a painter." (Note that the statement "We do not know, based on what we have seen so far, whether John_Smith is a painter" is different from "John_Smith is not a painter." The former is the absence of a label, while the latter is a negative label.) After the sign of the label has been determined, features are tracked to the extent that they might change the labeling decision made. Features whose weights have the same sign as the chosen label would not change the decision, so these features can be omitted from consideration. Instead, features are tracked that the opposite sign from the label. Thus, at some point during processing of $\mathcal{D}$, a new occurrence of an entity-feature pair is encountered for the optimistically-labeled entity (at 706). If the new entity-feature pair has a weight whose sign is opposite the label (as determined at 708), then the entity-feature pair is stored (at 710), either in the in-memory store or the external store (where the choice of store is made using the decision process described above). Otherwise, the entity-feature pair is not stored (at 712).

After processing of documents in $\mathcal{D}$ has completed (as indicated by the horizontal dotted line in FIG. 7), the stored weights, of those features that were observed for the entity after the label was applied, are added together (at 714). If these weights do not change the label (as determined at 716), then the assigned label is kept as-is (at 718). Otherwise, the label is revised (at 720). Revision of the label may be performed, for example, by reprocessing the documents in $\mathcal{D}$ for the possibly-mis-labeled entity, but with optimistic labeling turned off.

Figure 8:
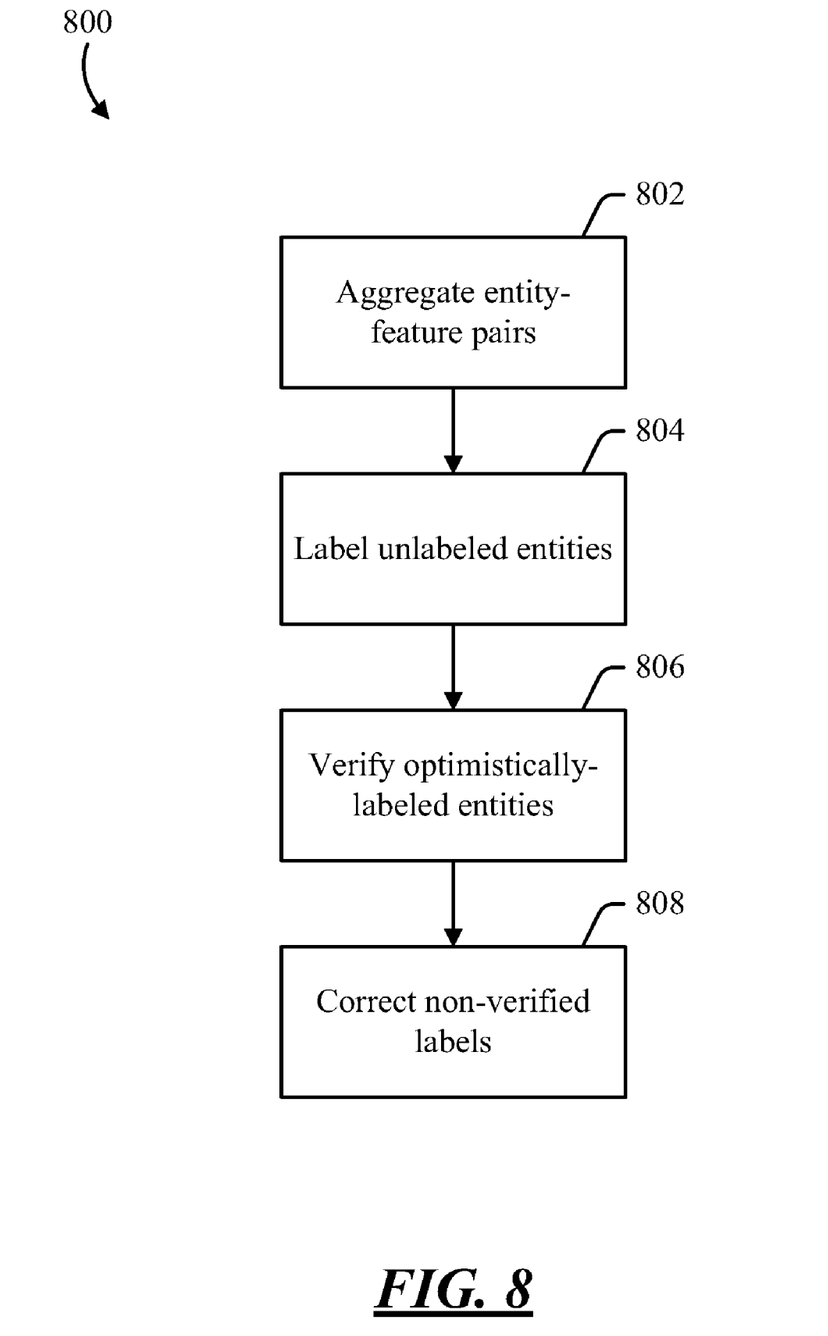
FIG. 8 is a flow diagram of an example process that may be used to post-process data extracted from documents.

Processing of documents $\mathcal{D}$, using the techniques described above, may result in some optimistically-labeled entities, some unlabeled entities, and a set of entity-feature pairs in the in-memory and external stores (where the external store is likely to contain a number of redundant pairs). A post-processing phase may be used to label documents based on the entity-feature pairs collected in both the in-memory and external stores, and to verify and correct optimistic labels. FIG. 8 shows an example process 800 that may be used to post-process data that was extracted from documents $\mathcal{D}$.

At 802, entity-feature pairs collected both in-memory and in the external store are aggregated. As previously noted, the external store may not support fast lookups of what is in the store. Thus, a search for duplicates may not be performed before writing a pair to the external store, so that store may contain duplicates. Aggregation of features may involve elimination of duplicates.

Once the entity-feature pairs are aggregated, the pairs are used to label the unlabeled entities (at 804). This labeling may be performed by adding up the feature weights and determining whether the sum of the feature weights exceeds a threshold (as in 118 and 120, of FIG. 1). Some entities will not have sufficient features to assign labels, and these entities may remain unlabeled.

At 806, the labels assigned to the optimistically-labeled entities may be verified. For example, this verification may be performed as in 714 and 716 of FIG. 7.

At 808, those optimistically-assigned labels whose correctness was not verified are then corrected. As noted above, correction of the label may involve reconsidering documents in $\mathcal{D}$ for the entity, but with optimistic labeling turned off.

As previously described, some features that may be searched for in an entity's context are text n-grams, and others are list-membership features. Lists may be derived from any source (e.g., documents available on the web). Some of these lists may be large, and certain techniques may be used to test for list membership efficiently.

One such technique is to construct bloom filters that test for list membership, where these filters provide no false negatives but some false positives. A bloom filter tests for membership in a set S. Thus, if $e \in S$, then the bloom filter returns true, but if $e \notin S$, then the bloom filter might return true or false. Thus, a true result from the bloom filter indicates that an entity might be a member of the list, so an entity that return a true result from the filter may be referred to as a "candidate." The number of membership checks against the filters may be reduced by maintaining a token table, $TT_{L_i}$, which contains the tokens occurring in any member of the list $L_i$. A given context may be sub-divided into "hit sequences," which are sequences of tokens present in $TT_{L_i}$. Membership of the hit sequences may be evaluated against the filters. For example, a particular document context may contain the phrase "drafted into a team by the National Basketball Association." The tokens may be "team", "national", "basketball", and "association", and the hit sequences may be "team", and "national basketball association". Rather than evaluating every subsequence of the context against the filters, these two hit sequences may be evaluated against the filters.

If there are a plurality of lists, $L_i$, then $Filter_{L_i}$ denotes the bloom-filter representation of the list $L_i$. For a substring s in a document, $s \in Filter_{L_i}$ if s is accepted by the filter. $G_{E,C}$ denotes the entity-candidate bipartite graph between entities and the filters $Filter_{L_i}$, i=1, . . . , f (where f is the number of filters). $G_{E,C}$ contains a node for each element e, and a node for each candidate string in an entity context which is accepted by any of the filters. $G_{E,C}$ contains an edge (e, s) whenever the string s accepted by some filter $Filter_{L_i}$ occurs in the document context of e in some document in $\mathcal{D}$. Some of the edges in $G_{E,C}$ are false positives. After the graph has been constructed, false positives may be removed by comparing the edges with the actual lists. If the lists and a representation of the graph edges are stored in a database, then it is straightforward to remove false positives by joining the lists with the edges, where this join can be performed efficiently by a database system.

Since certain entities tend to occur more frequently in documents than others, this fact may be leveraged to reduce the number of entity-candidate edges that are created in $G_{E,C}$. During processing of $\mathcal{D}$, small sets (which may be referred to as $Prune_{L_i}$) may be maintained, which contain those members of $L_i$ that are most-frequently-observed in members $\mathcal{D}$. (For example, the n % most-frequently-occurring members may be maintained in $Prune_{L_i}$, where n might equal 1%, 2%, 5%, 10%, or some other value.) During processing of $\mathcal{D}$, entities may be compared with $Prune_{L_i}$, and entities that are observed to be members of the "prune" set may be conclusively identified as list members, without having to consult a filter, and thus without having to write out entity-candidate edges. This technique may reduce the number of entity-candidate edges that would otherwise have to be written and later verified against the actual lists.

Figure 9:
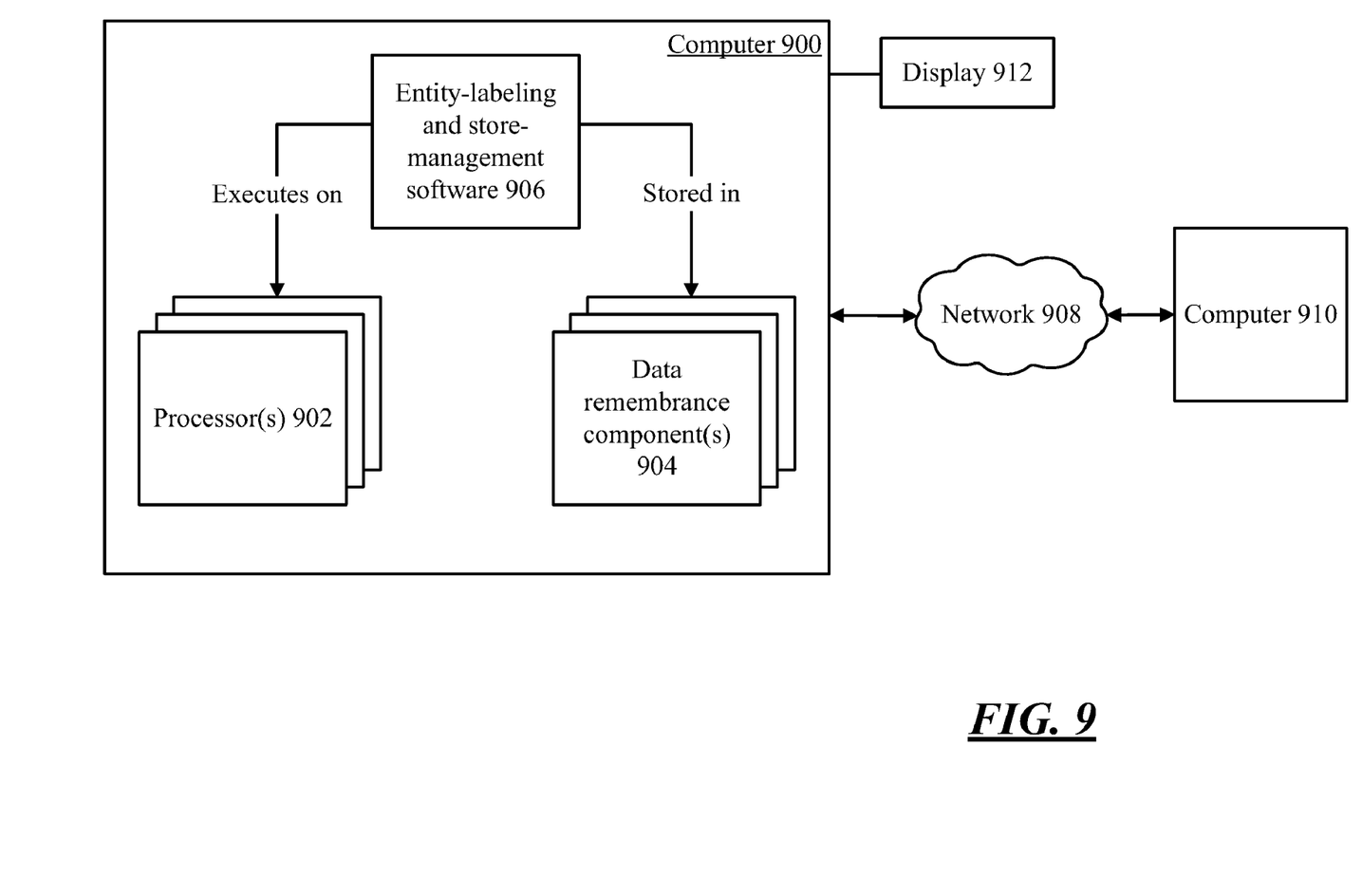
FIG. 9 is a block diagram of example components that may be used in connection with implementations of the subject matter described herein.

FIG. 9 shows an example environment in which aspects of the subject matter described herein may be deployed.

Computer 900 includes one or more processors 902 and one or more data remembrance components 904. Processor(s) 902 are typically microprocessors, such as those found in a personal desktop or laptop computer, a server, a handheld computer, or another kind of computing device. Data remembrance component(s) 904 are components that are capable of storing data for either the short or long term. Examples of data remembrance component(s) 904 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 900 may comprise, or be associated with, display 912, which may be a cathode ray tube (CRT) monitor, a liquid crystal display (LCD) monitor, or any other type of monitor.

Software may be stored in the data remembrance component(s) 904, and may execute on the one or more processor(s) 902. An example of such software is entity-labeling and store-management software 906, which may implement some or all of the functionality described above in connection with FIGS. 1-8, although any type of software could be used. Software 906 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 9, although the subject matter described herein is not limited to this example.

The subject matter described herein can be implemented as software that is stored in one or more of the data remembrance component(s) 904 and that executes on one or more of the processor(s) 902. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 900 may be communicatively connected to one or more other devices through network 908. Computer 910, which may be similar in structure to computer 900, is an example of a device that can be connected to computer 900, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of classifying entities, the method comprising:
using a processor to perform acts comprising:
recognizing occurrences of an entity in a plurality of documents;
identifying a plurality of features in contexts of said occurrences, a first one of the features being derived from a first context of a first one of the occurrences in a first one of the documents, and a second one of the features being derived from a second context of a second one of the occurrences in a second one of the documents;
calculating a sum of a plurality of weights, wherein each of the features is associated with one of the weights;
making a first determination that said sum exceeds a first threshold;
making a second determination that a label applies to said entity based on said first determination; and
storing or communicating a fact that said label applies to said entity, wherein said features comprise membership in a list, and wherein said acts further comprise:
choosing a subset of members of said members of said list based on members in said subset being estimated to occur more frequently in said documents than other members of said list; and
comparing a string that occurs in at least one of said contexts with members of said subset; and
making a third determination that said string represents a member of said list, said third determination being made (a) based on said string's being among said subset, and (b) without use of a filter that accepts all strings that are members of said list and accepts at least one string that is not a member of said list.

2. The method of claim 1, wherein said features comprise a text n-gram, and wherein said identifying comprises:
determining that said text n-gram occurs in at least one of said contexts.

3. The method of claim 1, wherein said identifying comprises:
determining that a surface form of a member of said list occurs in at least one of said contexts.

4. The method of claim 1, wherein said acts further comprise:
storing a pair that comprises said entity and one of said features in either a first store or a second store; and
choosing whether to store said pair in said first store or said second store based on an estimate of a frequency of said pair in said documents.

5. The method of claim 1, wherein said documents contain a third feature of said entity, said third feature not being among said features, and wherein said acts further comprise:
determining that a probability that said label applies to said entity exceeds a second threshold, said second determination being made without consideration of said third feature.

6. The method of claim 1, wherein said documents contain a third feature of said entity, said third feature not being among said features, and wherein said acts further comprise:
verifying, based on data that comprises said third feature, that said label applies to said entity, said third feature having a sign opposite said label, said second determination having been made without consideration of said third feature.

7. The method of claim 1, wherein said features comprise membership in a list, and wherein said acts further comprise:
using said filter to identify a string that occurs in at least one of said contexts as a member of a set of candidates; and
performing a join of said set of candidates and said list to determine that said string is a member of said list and not a false positive accepted by said filter.

8. A system that classifies entities, the system comprising:
a volatile random-access memory;
an entity recognizer that identifies occurrence of a first entity in a document;
a feature extractor that identifies a feature that occurs in a context of said occurrence of said first entity;
a first entity-feature store that is located in said memory and that stores entity-feature pairs;
a second entity-feature store that is not located in said memory and that stores entity-feature pairs; and
a store manager that receives a first entity-feature pair obtained from a document processed by collective action of said entity recognizer and said feature extractor, wherein said store manager maintains a first list of entity-feature pairs and defines a subset of said first list as being those entity feature pairs that are estimated to occur at least with a first estimated frequency, a second entity-feature pair being stored in said first entity-feature store and being in said subset, and wherein said store manager determines whether to store said first entity-feature pair in said first entity-feature store or said second entity-feature store based on a first estimated frequency of said second entity-feature pair.

9. The system of claim 8, further comprising:
a component that, given an entity-feature pair (e,f) in which e is an entity and f is a feature, estimates the frequency of (e,f) based on a product of an estimated frequency of e and an estimated frequency of f.

10. The system of claim 8, further comprising:
a component that estimates a frequency of an entity-feature pair based on information comprising a frequency, in a training data set, of a feature in said entity-feature pair.

11. The system of claim 8, wherein said first entity-feature pair and said second entity-feature pair have the same entity as each other, wherein said store manager makes a determination that a second estimated frequency, of said first entity-feature pair, is higher than said first estimated frequency, and evicts said second entity-feature pair based on said determination.

12. The system of claim 8, wherein said first entity-feature pair comprises said first entity, e wherein said first entity does not appear in said first entity-feature store, and wherein said store manager determines that there is an entity, e', in said first entity-feature store that has a lower estimated frequency than e, there being k entity-feature pairs in said first entity-feature store having feature e', said store manager determining that a sum of frequencies of the entity-feature pairs in which e' is the feature is greater than a sum of the k lowest-frequency features in the first entity-feature store, said second entity-feature pair being one of said k lowest-frequency features, said store manager storing said first entity-feature pair in said first entity-feature store and evicting said second entity-feature pair from said first entity-feature store.

13. The system of claim 8, wherein said feature comprises membership in a second list, and wherein said feature extractor identifies said feature as occurring in said context of said first entity based on a finding that a second entity occurs both in said second list and in said context.

14. One or more computer-readable storage media that store executable instructions to perform a method of classifying entities, the method comprising:
recognizing occurrences of an entity in a plurality of documents;

identifying a plurality of first features in contexts of said occurrences;

assigning a label to said entity, based on weights of said first features, when probability of correctness of said label reaches a threshold, there being at least some second features in said document that are associated with said entity but that are not included among said first features;

verifying correctness of said label based one or more of said second features;

storing a first pair that comprise said entity and one of said first features in either a first entity-feature store that is in volatile random access memory, or a second entity feature store that is not in said memory;

choosing whether to store said first pair in said first entity-feature store based on a first estimate of said frequency of said first pair in said plurality of documents;

determining that said first estimate of said frequency is higher than an estimated frequency of a second pair that is stored in said first entity-feature store; and evicting said second pair from said first entity-feature store.

15. The one or more computer-readable storage media of claim 14, wherein the method further comprises:

calculating said first estimate as a product of a second estimate of a frequency of said entity in said documents and a third estimate of a frequency of said feature in said documents.

16. The one or more computer-readable storage media of claim 14, wherein the method further comprises:

encountering one of said second features in said documents; and storing a third pair that comprises said entity and said one of said second features based on a finding that a weight associated with said third pair has a sign opposite said label.

17. The one or more computer-readable storage media of claim 14, wherein the method further comprises:

after evaluation of said documents, assigning labels to entities to which a label is not assigned during evaluation of said documents.

* * * * *